Jan. 1, 1924. 1,479,609
A. F. JENKINS
PORTABLE ACETYLENE GENERATOR
Filed Jan. 24, 1920 2 Sheets-Sheet 1
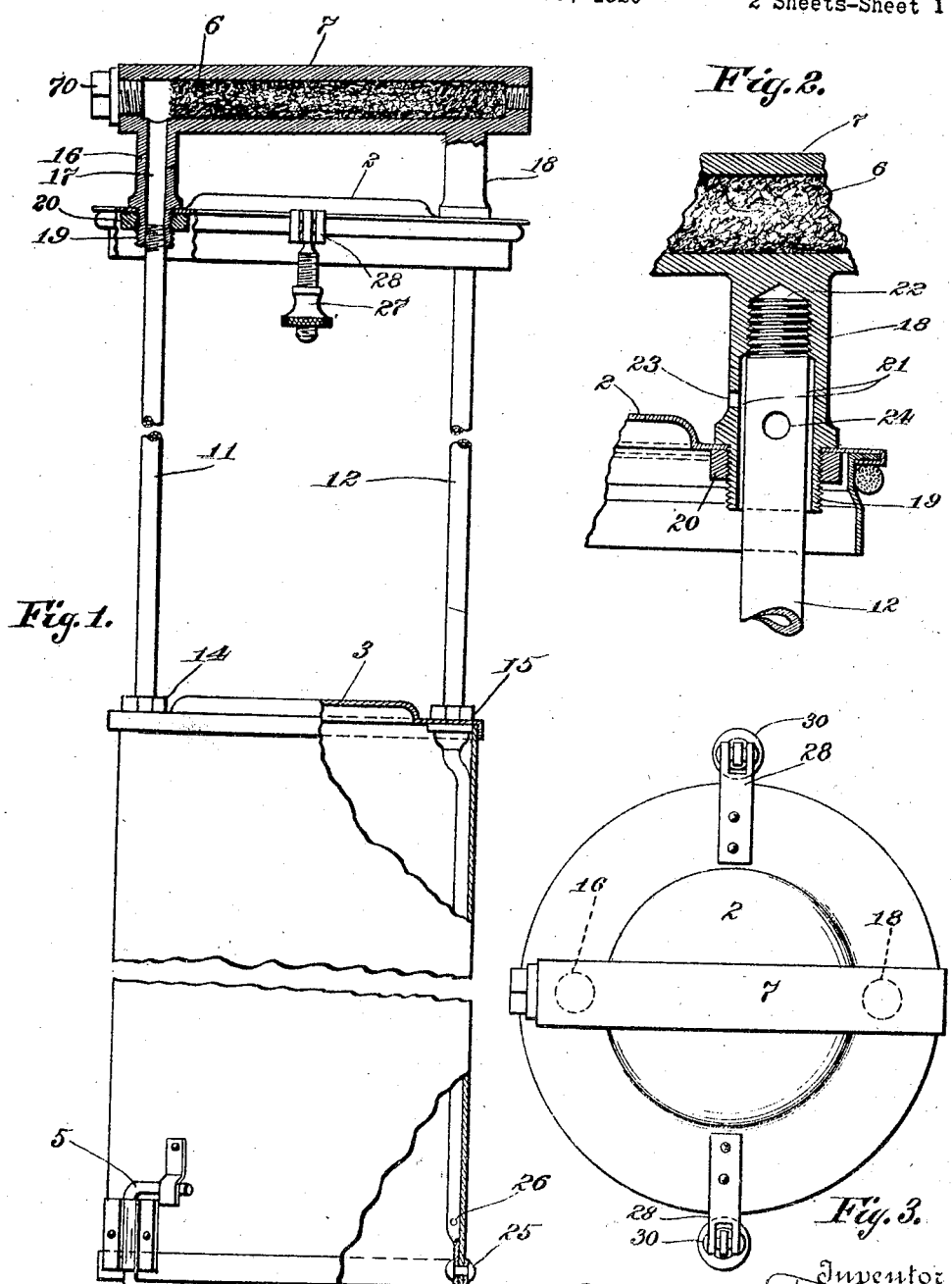
Witnesses
Porter H. Hautt
Mildred S. Wilson
Inventor
Alexander F. Jenkins
By 
Attorney

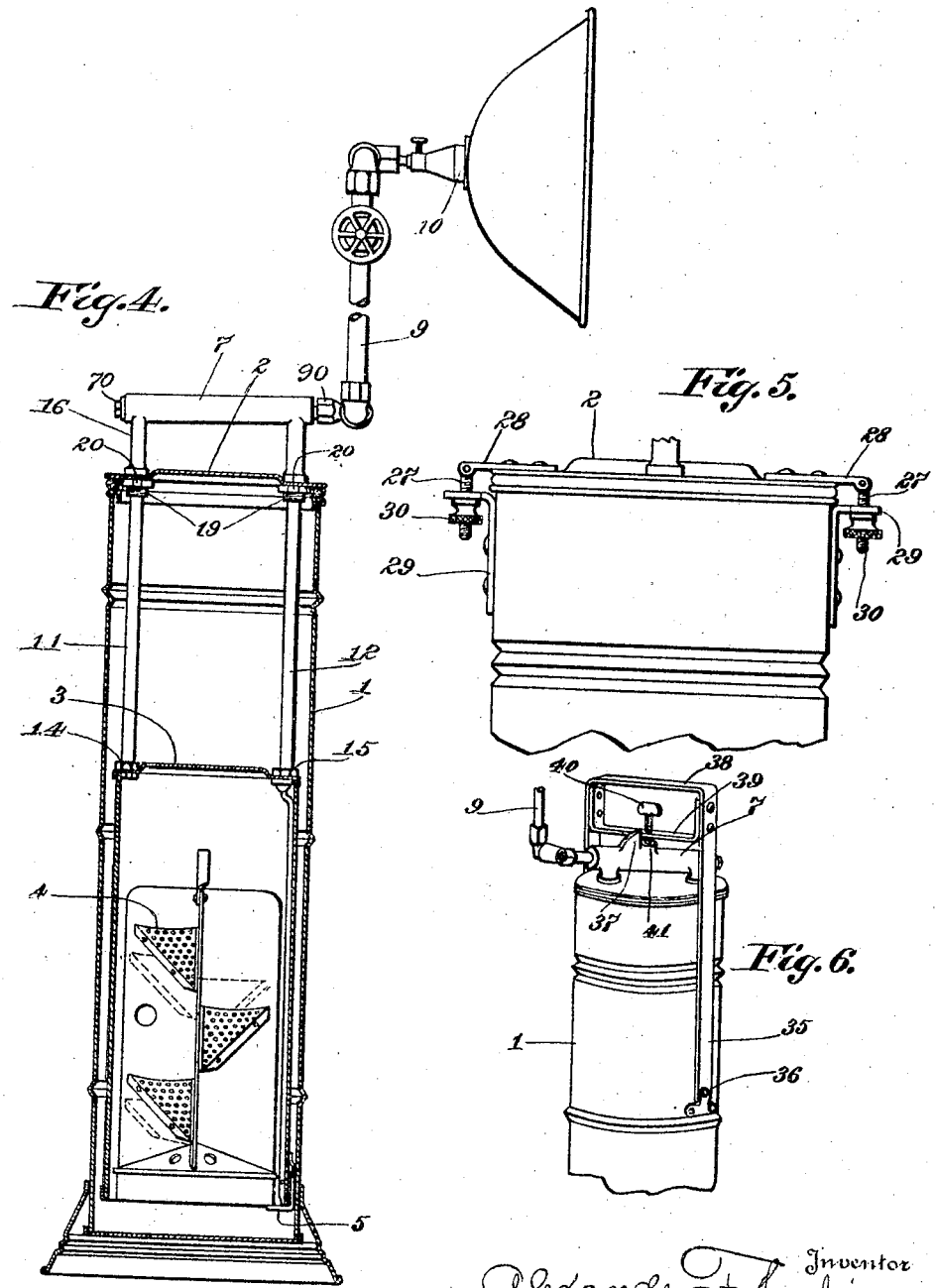

Patented Jan. 1, 1924.

UNITED STATES PATENT OFFICE.

ALEXANDER F. JENKINS, OF BALTIMORE, MARYLAND.

PORTABLE ACETYLENE GENERATOR.

Application filed January 24, 1920. Serial No. 353,864.

*To all whom it may concern:*

Be it known that I, ALEXANDER F. JENKINS, a citizen of the United States of America, residing in the city of Baltimore, State of Maryland, have invented certain new and useful Improvements in Portable Acetylene Generators, of which the following is a specification.

While in the form in which it has been developed, the invention is particularly adapted to use on portable generators which are largely used in connection with miners' and contactors' lights, certain features of the invention are capable of more general application, and while the device has been shown in connection with the recession type of generator, its use and the protection sought are not limited to this type of apparatus.

With this type of equipment, the lights are ordinarily mounted on or close to the generator, so that water and particles of solid, as carbide ash and the like, are more apt to be carried up with the gas, clogging the burner orifices than in the larger plants. Separation of all such solid and liquid impurities from the gas is, therefore, an important function; also in an apparatus of the portable type, compactness, rigidity, convenience in carrying and economy of weight are prime considerations.

In the present instance, I have provided first an efficient and convenient type of filter adapted to use on acetylene generators, and have arranged this filter in a filter chamber, which acts as a handle for use in carying the apparatus or as a handle for the cover to the tank, and in the preferred type in connection with which the invention is illustrated, the handle, tank cover and generator proper or bell are connected to form a single rigid structure by means of delivery and vent pipes which support the handle and filter chamber on the tank cover, and connect this chamber on the tank cover, and connect this cover and hence the handle to the generator proper, which, in the instance illustrated, is a drum or bell, within which the carbide basket is mounted or enclosed.

I have shown two forms of generators, both including a filter which is supported on the cover of the tank by rigid members, which extend down through the cover. One of these, as shown, acts as a delivery pipe and the other may be a vent. The filter casing may be grasped as a handle in removing the cover or in carrying the generator.

In the bell type of generator, these handle supports, in the form of vent and delivery pipe, extend down to the drum or bell, which is thus supported on the cover, the whole forming, with the bell and cover, a rigid structure. By fastening the cover the whole structure is made rigid with the tank, so that displacement of the parts is impossible.

I have shown two types of fastening, one includes pivoted screws with thumb nuts on the cover engaging ears on the tank. The other is in the form of a swinging bail pivoted to the tank, so that in vertical position the transverse member of the bail extends diametrically across the cover, preferably at right angles to or substantially at right angles to the filter casing or pipe. This transverse member is provided with clamping means engaging the cover, and the transverse member of the bail may be so formed and placed as to act as a handle in carrying the generator.

As the gas necessarily passes from the generator by way of the filter, the filter casing is adapted to receive a pipe fitting, to which the gas distributing pipe which may act as a burner support is attached.

In the accompanying drawing, I have illustrated a generator with slight variations embodying my invention.

In the drawing:

Figure 1 is an elevation of a bell, filter, casing and tank cover with connections, certain parts being shown in section for added clearness of illustration.

Figure 2 is a detail section taken at one end of the filter and showing the outlet of the vent pipe.

Figure 3 is a plan of the cover, also showing a filter casing in plan and one form of cover fastening.

Figure 4 is a vertical central section of a generator, embodying various features of my invention.

Figure 5 is a detail of one form of cover fastening.

Figure 6 is a detail in still another form.

Referring to the drawings by numerals, the structure, as shown, consists of a water tank, 1, having a cover, 2, the form of generator in connection with which the invention is shown, being of the bell type, and including an inverted drum or bell, 3, in which is a suitable carbide support or basket, 4, the same being, as illustrated, secured or supported in the bell by means of any suitable type of clamp or hook, 5.

In the structure shown the generator is also provided with a suitable filter or strainer, 6, consisting, in the present instance, of hair or other straining or filtering material, packed or suitably arranged in a casing shown in the form of a pipe or tube, 7, leading from the delivery pipe to the distributing pipe, 9 (see Figure 4) carrying a burner or light, 10.

According to the most approved form of the invention, the filter casing or pipe, 7, is so arranged and supported as to form a convenient handle for the cover, 2, or for the entire generator.

The filter, in the form of the invention shown, forms with the tank cover, 2, and the bell, 3, a rigid structure, the filter casing, the cover and the bell being connected in operative relation by uprights, 11, 12.

In the present instance, the upright, 11, serves as the delivery pipe, and the upright, 12, as a vent for carrying surplus gas to the atmosphere in case of excess generation from any cause, the object being to maintain a uniform pressure condition in the system, and to prevent disturbance and blowing out of the water in case of excess pressure in the tank. Both pipes, 11 and 12, are rigidly secured to the bell, 3, at 14 and 15, and extend upward to the cover, 2, to which they are likewise secured by suitable fittings, the pipes themselves or extensions of these pipes leading through and beyond the cover to which they are secured as follows:

The filter casing or pipe, 7, is as shown a U shaped casting in inverted position, one leg of the U, 16, has a central passage or bore, 17, extending the entire length of the leg and into the filter chamber within the pipe, 7. The pipe or tube 7 is open at both ends receiving the fitting 90 which connects with the distributor 9 at one such opening and the other end being closed by a screw plug 70, the latter opening provides for the convenient removal and replacement of the filter material.

In the form of the invention shown, the details being more or less interchangeable and immaterial, the legs, 16 and 18, are reduced at their lower extremities and threaded at 19, the threaded ends being passed downward through suitable apertures in the cover. Beneath the cover, engaging each threaded portion, 19, is a nut, 20. The leg, 18, of the U in the form shown has an aperture, 21, extending upward from the bottom, the same terminating and being closed short of the filter chamber. The aperture, 21, is of slightly greater diameter than the outside dimension of the upright, 12. Above and beyond the aperture, 21, is a reduced bore, 22, also stopping short of the chamber the bore being threaded to receive and fit the threaded end of the upright, 12, which is thrust upward through the enlarged opening, 21, and secured in the threaded bore, leaving an annular space, 22. The leg, 18, is bored radially at 23, leading from the outer surface into the enlarged aperture, 21, and the pipe or upright, 12, is bored radially or laterally at 24, providing any sufficient number of openings for the escape of excess gas. The vent pipe, 12, also has a suitable connection inside the drum, extending downward to a point near the bottom, where it may be suitably fastened at 25, and provided with an inlet opening, 26, for the admission of excess gas. When the water is depressed, this opening, 26, ordinarily limits the depression of the water. The exact arrangement of the upright, 12, as illustrated, and the exact details of other parts of the structure are regarded as nonessential to the invention.

The upright, 11, which serves as a delivery pipe, is threaded into the lower end of the leg, 16, which has a continuous central passage, 17, leading from the passage in the upright, 11, to the filter chamber, 7, containing the fibrous material, 6. The delivery pipe, 11, as aforesaid, is connected with the interior of the drum, 3, at or near the top.

The cover, 2, in the form of the invention illustrated, particularly in Figures 1, 2, 3, is secured in a position on the generator by means of screws or bolts, 27, pivotally mounted on suitable brackets, 28, on the cover, and swinging into and out of engagement with slotted ears, 29, secured to the sides of the generator tank near the top. The screws, 27, are provided with thumb nuts, 30, which engage the ears from beneath so that by tightening the nuts the cover closure is complete.

In Figure 6, I have illustrated a form of cover fastening, consisting of a pivoted bail like member, 35, shown as made of flat strip or strap iron, and pivoted at its lower extremities to the sides of the generator tank, 36. In this instance the filter casing, 7, is shown as provided with a stop, 37, to locate the bail in central position, and the transverse member of the bail as shown is formed of two spaced members or straps, 38 and 39, the strap, 39, carrying a thumb screw, 40, near its central point, threaded therein and adapted to engage a suitably flattened seat, 41, on the filter casing, and the bail, which is adapted to swing free of the top of the tank, when clamped, may serve as a handle for the tank or for the entire generator, and the filter casing, 7, may serve only as a handle for removing the cover and bell with the carbide carrier. Having reference to the structure illustrated, particularly in Figure 4, the filter pipe or casing, 7, which in each instance is slightly inclined, to provide for the draining of water filtered from the gas, back into the generator, serves as a handle either for the cover and bell and carrier thus connected and assembled, or as a handle for use in carrying the entire apparatus.

Having thus described specifically and in detail, a structure embodying the various features of my invention, I would have it understood that the specific terms herein are used descriptively rather than in a limiting sense, the scope of the invention being defined in the claims.

What I claim and desire to secure by Letters Patent is:

1. A portable acetylene generator having a hollow handle, means for leading the gas to and through the handle, and filtering means in the handle.

2. A portable acetylene generator, comprising a water tank, a bell within the tank, two members leading from the drum or bell, and extending above the top of the generator, and a hollow handle secured to said members, filtering material in said hollow handle and a delivery outlet therefor, one of said members being a delivery pipe leading to said filter.

3. In a portable acetylene generator, a drum or bell, a water tank having a cover, two members extending upward from said drum, secured to the cover, means rigid with said members, extending beyond the cover, a hollow handle extending transversely above the cover, and secured to the said members and filtering material in said hollow handle, one of said members being a delivery pipe.

4. In a portable acetylene generator, a drum or bell, a water tank having a cover, two members extending upward from said drum, secured to the cover, means rigid with said members, extending beyond the cover, a filter, which is also a handle above the cover, and secured to the said members, one of said uprights being a delivery pipe, the other of said members being a vent.

5. A portable acetylene generator, having a vent pipe consisting of a hollow stud extending through a wall of the generator, a pipe leading from the gas space of the generator into said stud, the same being of less diameter than the hollow in the stud, so as to provide an annular chamber, surrounding the pipe, an opening in the pipe leading into said hollow chamber, and an opening leading from said hollow chamber outside the generator.

6. In a portable acetylene generator, a tank, a cover therefor, a drum with a carbide holder therein, supports leading upward from the drum secured to the cover, and extending above the cover, a handle secured to said supports, the handle being hollow, filtering material therein, and a delivery therefor, one of said supports being a vent pipe, and means for fastening the cover to the generator tank.

7. In a portable acetylene generator, a tank, a cover therefor, a drum with a carbide holder therein, supports leading upward from the drum secured to the cover, and extending above the cover, a handle secured to said supports, the handle being hollow, filtering material therein, and a delivery therefor, one of said supports being a delivery pipe, and the other a vent pipe, and means for fastening the cover to the generator tank.

Signed by me at Baltimore, Maryland, this 20th day of January, 1920.

ALEXANDER F. JENKINS.

Witnesses:
B. SCHROETER,
A. W. CARR.